(12) United States Patent
Denton et al.

(10) Patent No.: US 7,966,208 B2
(45) Date of Patent: Jun. 21, 2011

(54) METHOD FOR PURCHASE ORDER RESCHEDULING IN A LINEAR PROGRAM

(75) Inventors: Brian T. Denton, Winooski, VT (US); Robert J. Milne, Jericho, VT (US); Robert A. Orzell, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 1237 days.

(21) Appl. No.: 10/707,974

(22) Filed: Jan. 29, 2004

(65) Prior Publication Data

US 2005/0171825 A1 Aug. 4, 2005

(51) Int. Cl.
*G06Q 10/00* (2006.01)
(52) U.S. Cl. ...................................................... 705/7.12
(58) Field of Classification Search .................. 705/8
See application file for complete search history.

(56) References Cited

U.S. PATENT DOCUMENTS

| | | | |
|---|---|---|---|
| 5,093,794 A | | 3/1992 | Howie et al. |
| 5,233,533 A | * | 8/1993 | Edstrom et al. ............... 700/103 |
| 5,943,484 A | | 8/1999 | Milne et al. |
| 5,971,585 A | * | 10/1999 | Dangat et al. ................. 700/102 |
| 6,041,267 A | | 3/2000 | Dangat et al. |
| 6,088,626 A | * | 7/2000 | Lilly et al. ..................... 700/100 |
| 6,119,102 A | * | 9/2000 | Rush et al. ........................ 705/29 |
| 6,151,582 A | | 11/2000 | Huang et al. |
| 6,498,786 B1 | | 12/2002 | Kirkby et al. |
| 6,701,201 B2 | | 3/2004 | Hegde et al. |
| 6,898,472 B2 | | 5/2005 | Crampton et al. |
| 7,164,959 B2 | | 1/2007 | Huang et al. |
| 7,197,469 B2 | | 3/2007 | Hegde et al. |
| 7,464,147 B1 | | 12/2008 | Fakhouri et al. |
| 2002/0133387 A1 | | 9/2002 | Wilson et al. |
| 2002/0188499 A1 | | 12/2002 | Jenkins et al. |
| 2002/0198757 A1 | | 12/2002 | Hegde et al. |

(Continued)

FOREIGN PATENT DOCUMENTS

EP 0 425 405 A2 5/1991

(Continued)

OTHER PUBLICATIONS

Wang, Dingwei and Wei Wang. "Earliness/Tardiness Production Planning Approaches with Due-Window for Manufacturing Systems." Computers in Industrial Engineering, 34:4 (1998), pp. 825-836.*

(Continued)

*Primary Examiner* — Jonathan G. Sterrett
*Assistant Examiner* — Neil Kardos
(74) *Attorney, Agent, or Firm* — Gibb I.P. Law Firm, LLC; Richard M. Kotulak, Esq.

(57) ABSTRACT

The invention provides a method of rescheduling timing of when items on purchase orders are scheduled to be received in a linear programming production planning system. This methodology performs a pre-processing rescheduling of the timing of purchase order receipts into the earliest time period allowable in a pre-processing step. After this pre-processing, the invention solves the core production planning system equations using the rescheduled purchase order receipts. Then, the invention performs post-processing rescheduling, which sorts the purchase order receipts according to rescheduling flexibility, and subsequently sequentially reschedules the timing of each of the purchase order receipts in the order established by the sorting process. This process of sequentially rescheduling reschedules the timing of purchase order receipts into the latest time period allowable.

24 Claims, 5 Drawing Sheets

U.S. PATENT DOCUMENTS

| | | | | |
|---|---|---|---|---|
| 2003/0065415 | A1* | 4/2003 | Hegde et al. | 700/100 |
| 2003/0149631 | A1 | 8/2003 | Crampton et al. | |
| 2003/0208392 | A1 | 11/2003 | Shekar et al. | |
| 2004/0030428 | A1* | 2/2004 | Crampton et al. | 700/101 |
| 2005/0144056 | A1* | 6/2005 | Wang et al. | 705/8 |

FOREIGN PATENT DOCUMENTS

EP          0425405 A2    5/1991

OTHER PUBLICATIONS

Fang, Jian and Yugeng Xi. "A Rolling Horizon Job Shop Rescheduling Strategy in the Dynamic Environment." International Journal of Advanced Manufacturing Technology, 13 (1997), pp. 227-232.*

Potts, C. N. and L. N. Van Wassenhove. "Single Machine Scheduling to Minimize Total Late Work." Operations Reaserch, 40:3 (1992), pp. 586-595.*

Wang, Wei, et al. "JIT Production Planning Approach with Fuzzy Due Date for OKP Manufacturing Systems." International Journal of Production Economics, 58 (1999), pp. 209-215.*

Kern, Gary M., and Jerry C. Wei. "Master Production Rescheduling Policy in Capacity-Constrained Just-In-Time Make-To-Stock Environments." Decision Sciences, 27:2 (Spring 1996). pp. 365-387.*

Khalid Sheikh, Manufacturing Resource Planning (MRP II): With an Introduction to ERP, SCM, and CRM 130-133 (McGraw-Hill 2003).*

Leachman et al., "IMPRESS: An Automated Production-Planning and Delivery-Quotation System at Harris Corporation-Semiconductor Sector", Interfaces vol. 26:1, pp. 6-37, 1996.

Nemhauser et al., İnteger and Combinatorial Optimization, Chapter 2—Linear Programmig, pp. 27-41, 1999.

G. Dantzig, "Linear Programmign and Extensions", Princeton University Press, pp. 448-455, 1963.

Moodie, D., "Demand Management: The Evaluation of Price and Due Date Negotiation Strategies Using Simulation," Production and Operations Management, vol. 8, No. 2, Summer 1999, pp. 151-162.

Denton et al., U.S. Appl. No. 10/707,977, Office Action Communication, Mar. 18, 2009, 10 Pages.

Karabuk, et al. "Coordinating Strategic Capacity Planning in the Semiconductor Industry". Operations Research, vol. 51, No. 6, Nov.-Dec. 2003, pp. 839-849.

Chen, H. et al., "A Lagrangian Relaxation Approach for Supply Chain Planning with Order/Setup Costs and Capacity Constraints". Journal of Systems Science and Systems Engineering, vol. 12, No. 1, pp. 98-100, Mar. 2003.

Chu, S. "A Mathematical Programing Approach Towards Optimized Master Production Scheduling", Int'l J. of Production Economics, vol. 38, pp. 269-279.

Eksioglu, S. "Optimizing Integrated Production, Inventory and Distribution Problems in Supply Chains". A Dissertation, University of Florida, 2002.

George B. Dantzig, G.B., et al. "Decomposition Principle for Linear Programs", Operations Research, vol. 8, No. 1 (Jan.-Feb. 1960), pp. 101-111.

Denton et al., U.S. Appl. No. 10/707,979, Office Action Communication, Jan. 8, 2010, 21 pages.

de Farias, D., "The Linear Programming Approach to Approximate Dynamic Programming: Theory and Application," Dissertation, Stanford University, Jun. 2002.

Leachman, R., et al., "IMPReSS: An Automated Production-Planning fi and Delivery-Quotation System at Harris Corporation-Semiconductor Sector," Interfaces vol. 26, No. 1, 1996.

de Farias, D., et al., "The Linear Programming Approach to Approximate Dynamic Programming," Operations Research, vol. 51, No. 6, Nov.- Dec. 2003, pp. 850-865.

Denton et al., U.S. Appl. No. 10/070,979, Office Action Communication, Aug. 4, 2009, 26 Pages.

de Farias, D., "The Linear Programming Approach to Approximate Dynamic Programming: Theory and Application," Jun. 2002, 44 pages.

Leachman, et al. "IMPReSS: An Automated Production-Planning and Delivery-Quotation System at Harris Corporation-Semiconductor," Interfaces 26: 1, Jan.-Feb. 1996, pp. 6-37.

Denton et al., U.S. Appl. No. 10/707,977, Office Action Communication, Nov. 18, 2009, 17 pages.

Denton et al., U.S. Appl. No. 12/125,193, Office Action Communication, Feb. 9, 2010, 24 pages.

Denton et al., U.S. Appl. No. 12/434,733, Notice of Allowance, Apr. 12, 2010, 9 pages.

Chen et al., "Quantity and Due Date Quoting Available to Promise," Information Systems Frontiers, vol. 3, Issue 4, pp. 477-488, 2001.

Wang et al., "Soft Computing for Multicustomer Due-Date Bargaining," IEEE Transactions on Systems, Man and Cybernetics Part C: Applications and Reviews, vol. 26, No. 4, Nov. 1999.

Hegedus et al., "Due Date Setting with Supply Constraints in Systems Using MRP," Computers & Industrial Engineering 39, pp. 293-305, 2001.

Denton et al., U.S. Appl. No. 10/707,979, Office Action May 13, 2010, 21 pages.

Hung, et al., "A Production Planning Methodology for Semiconductor Manufacturing Based on Iterative Simulation and Linear Programming Calculations," IEEE Transactions on Semiconductor Manufacturing, vol. 9, No. 2, May 1996, pp. 257-269.

Lyon, et al., "Matching Assets with Demand in Supply-Chain Management at IBM Microelectronics," Interfaces 31: Jan. 1-Feb. 2001 (pp. 108-124).

Nagarur, et al., "Production Planning and Scheduling for Injection Moulding of Pipe Fittings," A Case Study, Int. J. Production Economics 53, 1997, pp. 157-170.

Denton et al., U.S. Appl. No. 12/125,193, Office Action Communication, Jul. 23, 2010, 8 pages.

Denton et al., U.S. Appl. No. 10/707,979, Office Action Communication, Oct. 12, 2010, 17 pages.

Leachman, et al., "IMPReSS: An Automated Production-Planning and Delivery-Quotation System at Harris Corporation-Semiconductor Sector," Interfaces vol. 26, No. 1, 1996.

Yi-Feng Hung, "A Production Planning Methodology for Semiconductor Manufacturing Based on Iterative Simutaltin and Linear Programming Calculation," IEEE transactions on Semiconductor Manufacturing, vol 9, No. 2, May 1996.

Nagarur, et al, "Production Planning and Scheduling for injection moulding of pipe Fittings A case Study," Int. J. Production Economics 53 (1997) 157-170.

Lyon, et al, "Matching Assets with Demand in Supply-Chain Management at IBM Microelectronics," Interfaces 31:1 Jan.-Feb. 2001, pp. 108-124.

Chu, S. "A Mathematical Programing Approach Towards Optimized Master Production Scheduling", Int'l J. of Production Economics, vol. 38, pp. 269-279, 1995.

Denton et al., U.S. Appl. No. 12/125,193, Notice of Allowance Communication, Dec. 15, 2010, 7 pages.

Denton et al., U.S. Appl. No. 12/765,054, Office Action Communication, Jan. 5, 2011, 6 pages.

Wang et al., "Earliness/Tardiness Production Planning Approaches for Manufacturing Systems," 28 Computers and Industrial Engineering 425-436, 1995.

Wang et al., "Earliness/Tardiness Production Planning Approaches with Due-Window for Manufacturing Systems," 34 Computers and Industrial Engineering 825-836, 1998.

U.S. Appl. No. 10/707,979, Notice of Allowance Communication, Feb. 8, 2011, pp. 1-8.

* cited by examiner

METHOD FOR PURCHASE ORDER RESCHEDULING IN A LINEAR PROGRAM

CROSS REFERENCE TO RELATED APPLICATIONS

The present application is related to pending U.S. patent application Ser. No. 10/707,978, filed concurrently herewith to Denton et al., entitled "A METHOD FOR SUPPLY CHAIN COMPRESSION"; U.S. patent application Ser. No. 10/707,977, filed concurrently herewith to Denton et al., entitled "A METHOD FOR SUPPLY CHAIN DECOMPOSITION"; U.S. patent application Ser. No. 10/707,976, filed concurrently herewith to Denton et al., entitled "A METHOD FOR OPTIMIZING FOUNDRY CAPACITY"; U.S. patent application Ser. No. 10/707,972, filed concurrently herewith to Denton et al., entitled "METHOD FOR FAIR SHARING LIMITED RESOURCES BETWEEN MULTIPLE CUSTOMERS"; U.S. patent application Ser. No. 10/707,979, filed concurrently herewith to Denton et. al., entitled "A METHOD FOR CONSIDERING HIERARCHICAL PREEMPTIVE DEMAND PRIORITIES TN A SUPPLY CHAIN OPTIMIZATION MODEL"; U.S. patent application Ser. No. 10/707,973, filed concurrently herewith to Denton et al., entitled "METHOD FOR SIMULTANEOUSLY CONSIDERING CUSTOMER COMMIT DATES AND CUSTOMER REQUEST DATES"; and U.S. patent application Ser. No. 10/708,119, filed concurrently herewith to Orzell et al., entitled "METHOD FOR IDENTIFYING PRODUCT ASSETS IN A SUPPLY CHAIN USED TO SATISFY MULTIPLE CUSTOMER DEMANDS". The foregoing applications are assigned to the present assignee, and are all incorporated herein by reference.

BACKGROUND OF INVENTION

1. Field of the Invention

The present invention relates to computer implementable decision support systems for rescheduling purchase order receipts. General methodologies within this field of study include advanced planning systems, optimization and heuristic based algorithms, constraint based programming, and simulation.

2. Description of the Related Art

A fundamental problem faced in all manufacturing industries is the allocation of material and capacity assets to meet end customer demand. Production lead times necessitate the advance planning of production starts, interplant shipments, and material substitutions throughout the supply chain so that these decisions are coordinated with the end customers' demand for any of a wide range of finished products (typically on the order of thousands in semiconductor manufacturing). Such advance planning depends upon the availability of finite resources which include: finished goods inventory, work in process inventory (WIP) at various stages of the manufacturing system, and work-center capacity. Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demand to satisfy and how to satisfy it. This resource allocation problem is often addressed through linear programming.

The below-referenced U.S. patents disclose embodiments that were satisfactory for the purposes for which they were intended. The disclosures of both the below-referenced prior U.S. patents, in their entireties, are hereby expressly incorporated by reference into the present invention for purposes including, but not limited to, indicating the background of the present invention and illustrating the state of the art: U.S. Pat. No. 5,971,585, "Best can do matching of assets with demand in microelectronics manufacturing," Oct. 26, 1999; U.S. Pat. No. 5,943,484, "Advanced material requirements planning in microelectronics manufacturing," Aug. 24, 1999; and Nemhauser, G. L. and Wolsey, L. A., 1999, Wiley, *Integer and Combinatorial Optimization*.

SUMMARY OF INVENTION

In view of the foregoing and other problems and drawbacks of conventional systems and methods, it is therefore an object of the present invention to provide a method and system that tentatively (pre-processing) reschedules purchase order receipts into earlier time periods, solves the resulting core production planning equations using a linear programming solver, and subsequently (post-processing) reschedules the purchase order receipts to later time periods based on need. Thus, the invention moves the purchase order receipts into an earlier time period based upon frozen rules and a "net up front" indicator. The invention also creates recommended arrival times for the purchase order receipts that reflect the time of need, frozen zones, and tolerances. Further, the invention sorts the purchase order receipts based on a preferred sorting criteria and recomputes ending inventory to reflect the recommended rescheduling.

More specifically, the invention provides a method of rescheduling timing of when items on purchase orders are scheduled to be received in a linear programming production planning system. This methodology performs a pre-processing rescheduling of the timing of purchase order receipts into the earliest time period allowable in a pre-processing step. After this pre-processing, the invention solves the core production planning system equations using the rescheduled purchase order receipts. Then, the invention performs post-processing rescheduling, which sorts the purchase order receipts according to rescheduling flexibility, and subsequently sequentially reschedules the timing of each of the purchase order receipts in the order established by the sorting process. This process of sequentially rescheduling reschedules the timing of purchase order receipts into the latest time period allowable.

The pre-processing rescheduling of the timing of purchase order receipts is limited by flags associated with the purchase orders that either prevent the purchase order receipts from being rescheduled (according to frozen rules), or simply limit the extent to which the purchase order receipts can be rescheduled.

The sorting process first sorts the purchase order receipts into different classes of rescheduling flexibility. Then, the invention sorts the purchase order receipts within each of the classes of rescheduling flexibility into different classes of arrival dates and sorts the purchase order receipts within each of the classes of arrival dates based on quantities within the purchase orders.

The post-processing sequential rescheduling process reschedules the timing of each of the purchase order receipts into the latest time period before the corresponding inventory level would be depleted to zero. If the purchase order receipt timing can be extended beyond the latest date of the planning horizon of the linear programming production planning system, the purchase order can be eliminated. The invention also recomputes ending inventory levels to reflect the sequential rescheduling of the timing of purchase order receipts.

Thus, invention described below reschedules purchase order receipts in a context where a linear program (LP) is employed to provide the vast majority of the core decision making technology in determining a production plan. The invention works through pre-processing prior to the LP run and post-processing after the LP run. During a pre-processing step, purchase orders (POs) are pulled into the earliest time period permissible according to the "frozen rules." In a post-processing step, a heuristic algorithm pushes the POs out to the latest time period which avoids a worsening of customer service and honors the "frozen rules." This post-processing is accomplished by examining inventory balances as a function of purchase order movements and ensuring the inventory balances do not drop below zero throughout the planning horizon. As a result, this invention enables the improved control of inventory of purchased parts when an LP is the core decision technology in creating the production plan.

DETAILED DESCRIPTION

Detailed Description of Preferred Embodiment(s) of the Invention

The invention disclosed comprises a method for achieving the rescheduling of purchase order receipts. The system and method were employed to integrate the consideration of purchase order rescheduling with a linear programming based system for optimizing established planning objectives (e.g. customer service, short lead times, low inventory, and prioritized allocation of supply and capacity) to compute a feasible production plan.

Line items on purchase orders are sometimes referred to herein as "purchase order receipts." The invention reschedules the timing of when purchase order receipts are scheduled to be received (which is sometimes referred to herein as "receipt period") in a linear programming production planning system to maximize efficiency and minimize the cost of inventory. A purchase order is generally for a single part number, but sometimes it is for multiple part numbers. For each part number, a purchase order may have multiple line items associated with different requested delivery dates and different committed delivery dates. Each line item would be considered a "purchase order receipt." Often a purchase order would have a single line item, but not always. This methodology initially artificially reschedules the timing of purchase order receipts into the earliest time period allowable in a pre-processing step. After this pre-processing, the invention solves the core production planning system equations using the rescheduled purchase order receipts and subsequently reverses this artificial rescheduling in a post-processing rescheduling process.

Therefore, with the invention, the conventional core production planning equations and limitations are calculated assuming that all items on almost all purchase orders are received at the very beginning of the production planning horizon. In other words, this allows the invention to ignore various purchase order receipt timing issues (except for purchase order receipts that are frozen or have specific timing restrictions, as discussed in greater detail below) to most efficiently allocate different resources and different planning requirements within the production planning system. After the core production planning process is completed, the timing of the purchase order receipts is rescheduled so that this artificial timing advancement limitation (which permitted artificial maximum flexibility within the production planning system) is eliminated. By reversing the artificial advancements of timing of purchase order receipts, the invention pushes the actual timing of purchase order receipts back as far as possible within the production planning horizon so as to minimize costs associated with maintaining an excessively large inventory.

The post-processing pushes the timing of the purchase order receipts back to the latest allowable periods within the production planning system by sorting the purchase order receipts according to their rescheduling flexibility. The invention then subsequently reschedules (e.g., sequentially reschedules) the timing of each of the purchase order receipts in the order established by the sorting process. This post-processing process reschedules the timing of purchase order receipts into the latest time period allowable, again, to minimize the cost of inventory.

To contrast the present invention, a conventional production planning linear program "LP" is shown below (such as that described in U.S. Pat. No. 5,971,585, which is incorporated herein by reference). This LP makes decisions including: production starts, material substitutions, and shipments planned to customers, between manufacturing and distribution locations, and from vendor suppliers. A LP is composed of an objective function that defines a measure of the quality of a given solution, and a set of linear constraints. The types of equations used in production planning models are well know to those practiced in the art and include: (1) Material Balance Constraints, which ensure conservation of material flow through the network of stocking points comprising the supply chain.
(2) Capacity Constraints, which ensure that the capacity available for manufacturing activities is not exceeded.
(3) Backorder Conservation Constraints, which balance the quantity of a given part backordered in a given planning period with the quantity backordered in the previous planning period and the net of new demand and new shipments.
(4) Sourcing Constraints, which define target ranges (minimum and maximum) of shipments that should be made from a particular manufacturing or vendor location in the supply chain.

A conventional LP formulation is provided below in the form familiar to those practiced in the art; i.e., definition of subscripts, definition of objective function coefficients, definition of constants, definition of decision variables, LP formulation or equations.

DEFINITION OF SUBSCRIPTS j—time period
m—material (part number)
a—plant location within the enterprise
n—material being substituted
z—group (which represents a family or collection of part numbers)
e—process (a method of purchasing or manufacturing a material at a plant)
v—receiving plant location k—demand center (i.e., customer location) (Note: the set of customer locations is mutually exclusive from the set of plant locations)
q—demand class which indicates relative priority
w—resource capacity which could be a machine, labor hour, or other constraint
u—represents a consumer location which refers to an internal plant, external demand center, or to a generic indicator meaning any plant/or demand center

DEFINITION OF OBJECTIVE FUNCTION COEFFICIENTS $PRC_{jmae}$—cost of releasing one piece of part m during period j at plant a using process e
$SUBC_{jmna}$—substitution cost per piece of part number n which is being substituted by part number m during period j at plant a
$TC_{jmav}$—transportation cost per piece of part number m leaving plant a during period j which are destined for plant v
$INVC_{jma}$—inventory cost of holding one piece of part number m at the end of period j at a particular plant a
$DMAXC_{jzau}$—cost per piece of exceeding the maximum amount of shipments of group z parts from plant a to consuming location(s) u during period j
$DMINC_{jzau}$—cost per piece of falling short of the minimum amount of shipments specified for group z parts from plant a to consuming location(s) u during period j
$BOC_{jmkq}$—backorder cost of one piece of part m at the end of period j for class q demand at customer location k

DEFINITION OF CONSTANTS $DEMAND_{jmkq}$ demand requested during time period j for part number m at customer location k for demand class q
$RECEIPT_{jma}$—quantity of projected wip and purchase order receipts for part number m expected to be received at plant a during time period j
$CAPACITY_{jaw}$—Capacity of resource w available at plant a during period j to support production starts
$CAPREQ_{jmaew}$—Capacity of resource w required for part number m at plant a for process e during period j
$QTYPER_{jmaen}$—quantity of component m needed per part number n during period j at plant a using process e
$YIELD_{jmae}$—output of part number m per piece released or started at plant a during time period j using process e
$SUBQTY_{jmna}$ quantity of part number m required to substitute for one piece of part number n at plant a during time period j
$MAXPCT_{jzau}$—maximum percentage of total shipments of group z (collection of parts) leaving supplier a during period j to support consumption at consuming location(s) u
$MINPCT_{jzau}$—minimum percentage of total shipments of group z (collection of parts) leaving supplier a during period j to support consumption at consuming location(s) u
$CT_{jmae}$—Cycle time. The number of periods between the release and completion of part m jobs for releases made using process e at plant a during time period j
$TT_{mav}$—transport time for part number m from plant a to plant v

DEFINITION OF LP DECISION VARIABLES $I_{jma}$—Inventory at the end of period j for part number m at a particular plant a
$P_{jmae}$—Production starts of part m during period j at plant a using process e
$L_{jmna}$—Quantity of part number n which is being substituted by part number m during period j at plant a
$T_{jmav}$—Internal shipments of part number m leaving plant a during period j which are destined for plant v
$F_{jmakq}$—Shipments of part number m leaving plant a during period j and satisfying class q demand at external customer k
$B_{jmkq}$—Back orders of part m at the end of period j for class q demand at customer location k
$H_{jzu}$—Total shipments of group z (z is a "collection" of parts) leaving suppliers during period j to support consumption at consuming location(s) u
$S_{jzau}$—Amount by which total shipments of parts in z from plant a to consuming location(s) u during period j exceeds the maximum amount specified as desired in the sourcing rules
$G_{jzau}$—Amount by which total shipments of group z parts from plant a to consuming location(s) u during period j falls short of the minimum amount specified as desired in the sourcing rules LP Equations or Formulation The following minimizes the objective function subject to the constraints shown below.

Objective Function:

Minimize:

$$\sum_j \sum_m \sum_a \sum_e PRC_{jmae} P_{jmae} + \sum_j \sum_m \sum_n \sum_a SUBC_{jmna} L_{jmna} +$$

$$\sum_j \sum_m \sum_a \sum_v TC_{jmav} T_{jmav} + \sum_j \sum_m \sum_a INVC_{jma} I_{jma} +$$

$$\sum_j \sum_z \sum_a \sum_u DMAXC_{jzau} S_{jzau} + \sum_j \sum_z \sum_a \sum_u DMINC_{jzau} G_{jzau} +$$

$$\sum_j \sum_m \sum_k \sum_q BOC_{jmkq} B_{jmkq}$$

Subject to:

Sourcing Constraints:

$$H_{jzu} = \sum_{\substack{m \\ \varepsilon z}} \sum_a \left( T_{jmau} + \sum_q F_{jmauq} \right) \sum_{\substack{m \\ \varepsilon z}} \left( T_{jmau} + \sum_q F_{jmauq} \right) - S_{jzau} \leq$$

$$MAXPCT_{jzau} H_{jzu} \sum_{\substack{m \\ \varepsilon z}} \left( T_{jmau} + \sum_q F_{jmauq} \right) + G_{jzau} \geq MINPCT_{jzau} H_{jzu}$$

Capacity Constraints:

$$\sum_m \sum_e CAPREQ_{jmaew} P_{jmae} \leq CAPACITY_{jaw}$$

Backorder Constraints:

$$B_{jmkq} = B_{(j-1)mkq} + DEMAND_{jmkq} - \sum_a F_{jmakq}$$

Material Balance Constraints:

$$I_{jma} = I_{(j-1)ma} + RECEIPT_{jma} + \sum_{\substack{xsi.t \\ x+CT_{xmae}=j}} \sum_e YIELD_{xmae} * P_{xmae} +$$

$$\sum_n L_{jmna} + \sum_{\substack{xs.t \\ x+TT_{mav}=j}} \sum_v T_{xmva} - \sum_n SUBQTY_{jmna} * L_{jmna} -$$

$$\sum_v T_{jmav} - \sum_k \sum_q F_{jmakq} - \sum_{\substack{nst.m \\ \text{is a component} \\ \text{of } n}} \sum_e QTYPER_{jmaen} P_{jnae}$$

Non-Negativity Constraints:
all $X_{i,j\ldots} \geqq 0$ where X is a generic decision variable and i, j etc. represent generic subscripts.

Linear programs have been used to determine production plans for many years (see, for instance, U.S. Pat. No. 5,971,585). However, these linear programming applications have considered purchase orders as a fixed input to the application rather than as something which could be changed. In other words, the conventional linear programs did not reschedule purchase orders. The conventional purchase order rescheduling has been limited to Material Requirements Planning (MRP) systems (e.g. U.S. Pat. No. 5,943,484) which is a fundamentally different art field that the production planning art field. Further, this conventional MRP rescheduling has only been based on when the ordering plant needs the parts and "frozen rules." This prevents MRP rescheduling in the near term when the vendor may not have time to adjust delivery. Further, this rescheduling has only been accomplished within the context of heuristic based MRP calculations and not within linear programming.

Figure 1:
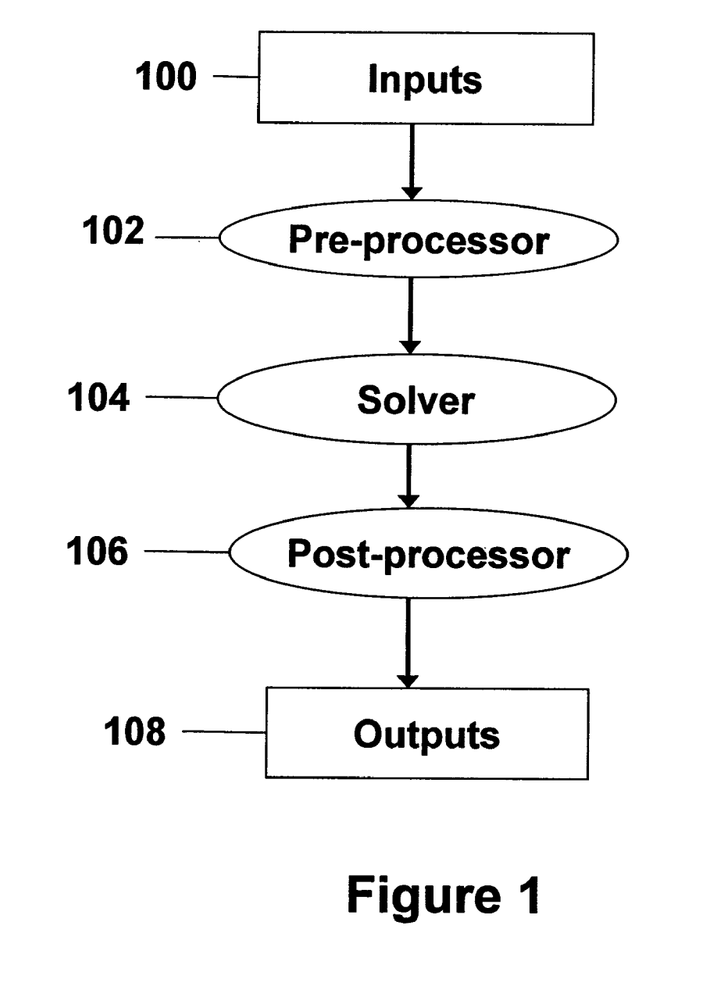
FIG. 1: Overview of the structure of a linear programming application.

Linear programming applications typically include the transformation of input files (block 100) into output files (block 108) through a pre-processor (block 102), solver (block 104), and post-processor (block 106) as shown in FIG. 1. The pre-processor (block 102) transforms the raw input files into a form useable by the linear programming solver. The solver (block 104) determines an optimal raw output solution which is transformed by the post-processor (block 106) into a format acceptable for usage. The present invention is embedded in the pre-processor (block 102) and post-processor (block 106) stages and is used to provide purchase order rescheduling.

One of the activities contained within the pre-processor (block 102) is the transformation of a raw input planned receipt file into a file which contains the projected WIP and purchase order receipts quantity expected to be received for each part number at each receiving plant during each time period. Conventionally, purchase order receipts are placed into the time period when they are currently expected to be received.

Figure 2:
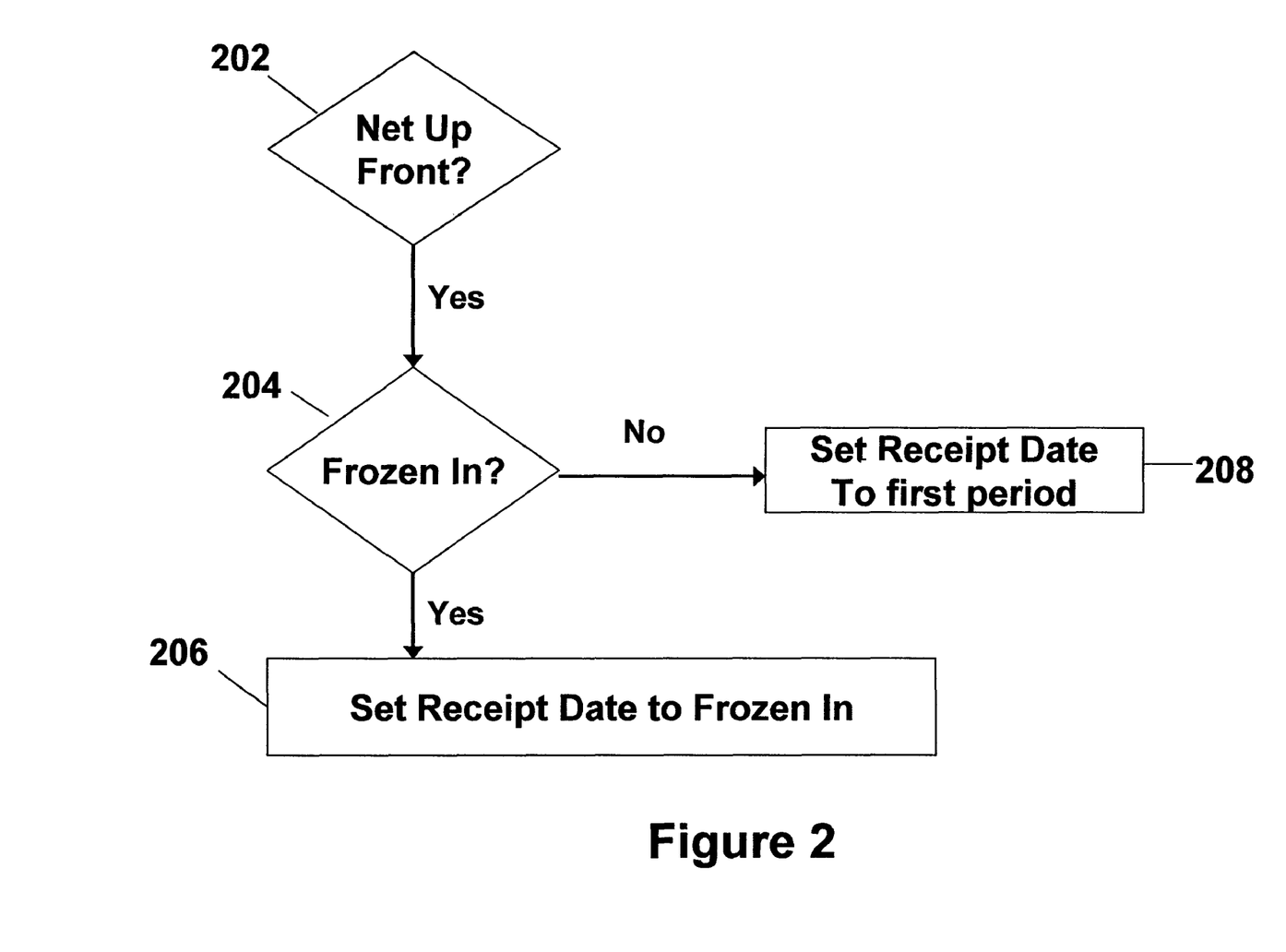
FIG. 2: Summary of pre-processor logic.

In one preferred embodiment, the logic for determining the period in which the purchase order receipt is placed is summarized in FIG. 2. It will be recognized by those skilled in the art that references to "purchase order/purchase order receipt" may also refer to purchase order line items or other agreements with vendors such as scheduling agreements, supply agreements, etc. In block 202, the invention checks to see if the particular receipt has a "net up front" flag which indicates whether or not it may be moved into an earlier time period than its present scheduled arrival date. If the receipt may be moved in, block 204 checks to see if there is a frozen-in zone flag or rule which limits the extent to which the receipt may be moved in. If there is no such frozen-in zone, then block 208 sets the receipt period to the first period of the planning horizon. Otherwise, block 206 will set the receipt period to the earliest period which is not earlier than implied by the frozen-in zone. In other words, the receipt period will be set to the earliest period during which the supplier will allow to the orderer to move it.

The result of this pre-processing is that the core solver (block 104) will be utilizing the purchase order receipts as if available in the earliest possible period, i.e., the planned start date. Subsequent to the core solver's execution, the post-processing steps will push the receipts out to the latest dates when they are needed and permissible according to the agreements with the suppliers. The post-processor steps unique to the invention are summarized in FIG. 3. The post-processor steps referenced in block 106 refer to these FIG. 3 steps included in this invention in addition to the post-processor steps required to transform the core solver output into a format acceptable for usage.

Figure 3:
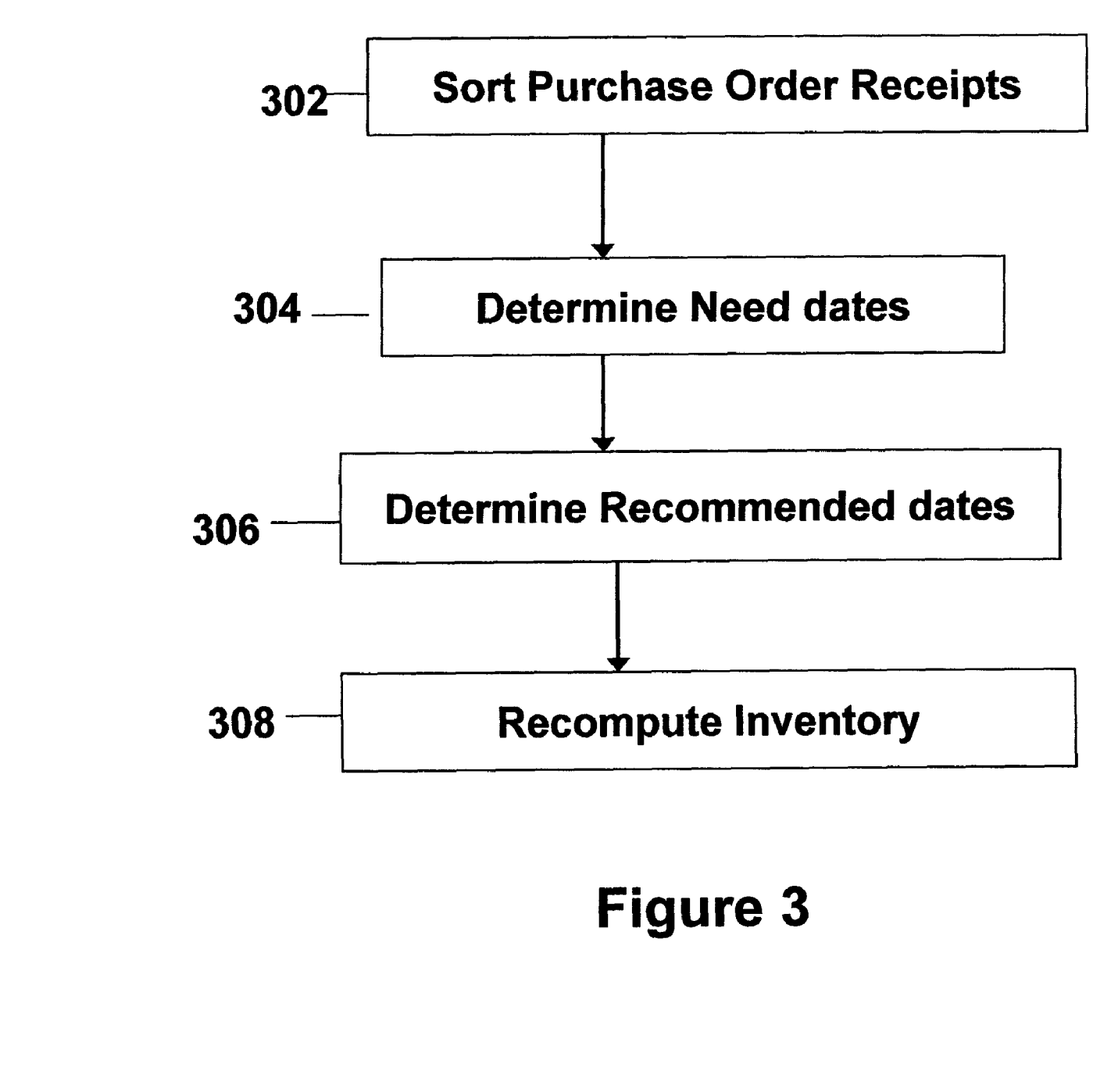
FIG. 3: Summary of post-processor logic.

In block 302, the purchase order receipts are sorted. There are a number of reasonable ways to sort the purchase order receipts. The sorting of one preferred embodiment is summarized in FIG. 4. Block 402 establishes the primary sorting criteria which is based on the flexibility to reschedule out. Some purchase order receipts may not be rescheduled later in time because they are within the "frozen out" zone. That is, they are within the period of time during which the orderer does not have the freedom or flexibility to reschedule later in time. These frozen out zones are typically established to allow the supplier time to build in advance without fear of having purchase order cancellations/delays result in excess and/or unsold inventory. Consequently, block 402 sequences purchase order receipts which may be rescheduled out at the beginning of the purchase order receipt list and those which may not be rescheduled out at the end of the purchase order receipt list.

Figure 4:
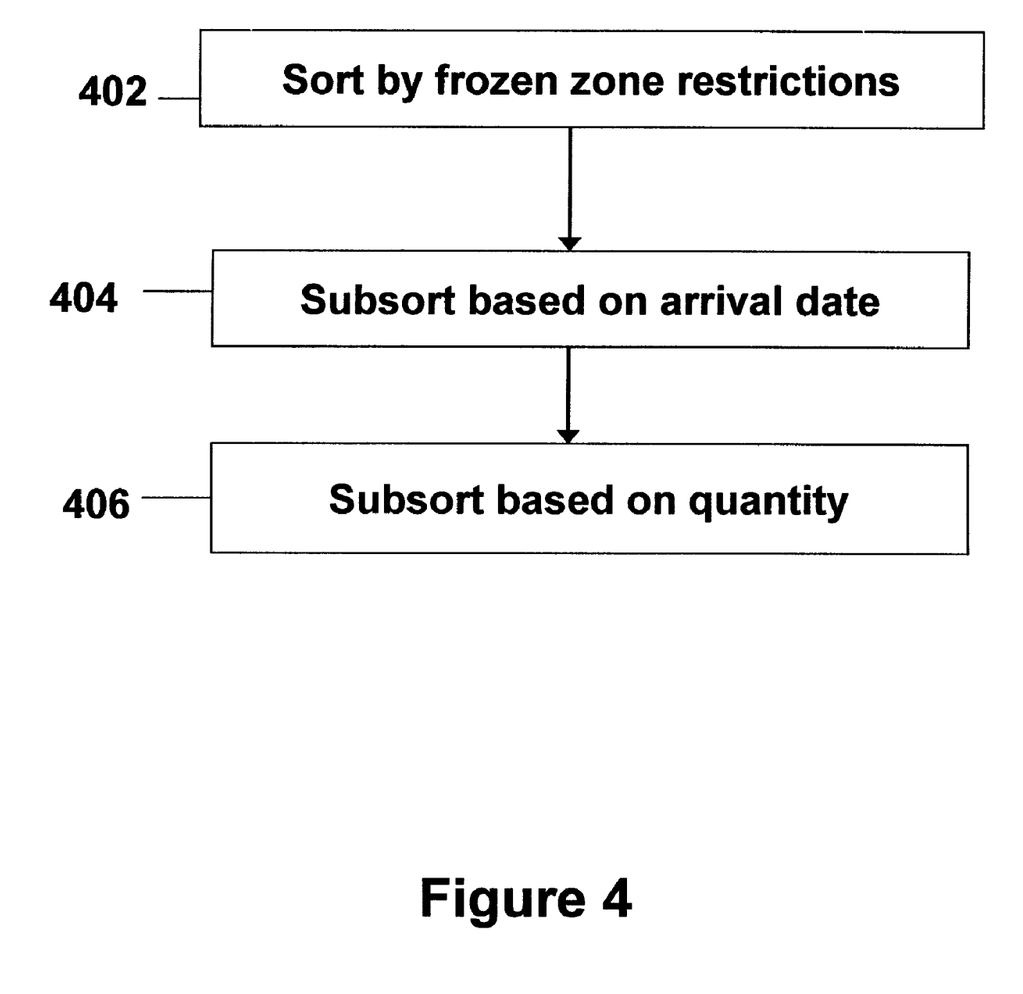
FIG. 4: Summary of post-processor sorting logic.

Blocks 404 and 406 establish secondary and tertiary sorting criteria respectively. In block 404, the sub-sorting is performed in sequence of increasing scheduled arrival dates. This is done to preferentially consider the most imminent portion of the planning horizon first. Finally, block 406 establishes the final (and least important) sorting criteria by sub-sorting in sequence of decreasing quantities.

Block 304 determines the "need dates" of the purchase order receipts. These are the dates that the purchase order receipts are needed to arrive to stock at the receiving location. Block 304 processes the purchase order receipts according to the sort sequence specified in block 302. For each purchase order receipt, block 304 pushes the receipt out in time into the latest time period which does not result in a negative inventory situation. Step 304 is an iterative step in which the timing of the purchase order receipt is moved out into successively later periods and material balance equations are rebalanced at each iteration. If there are no such periods in which the inventory variable becomes negative then this is an indication that the purchase order receipt is not needed. In this case, the purchase order receipt is flagged as "not needed." The resulting iterative modifications to inventory in each time period is maintained in memory.

Figure 5:
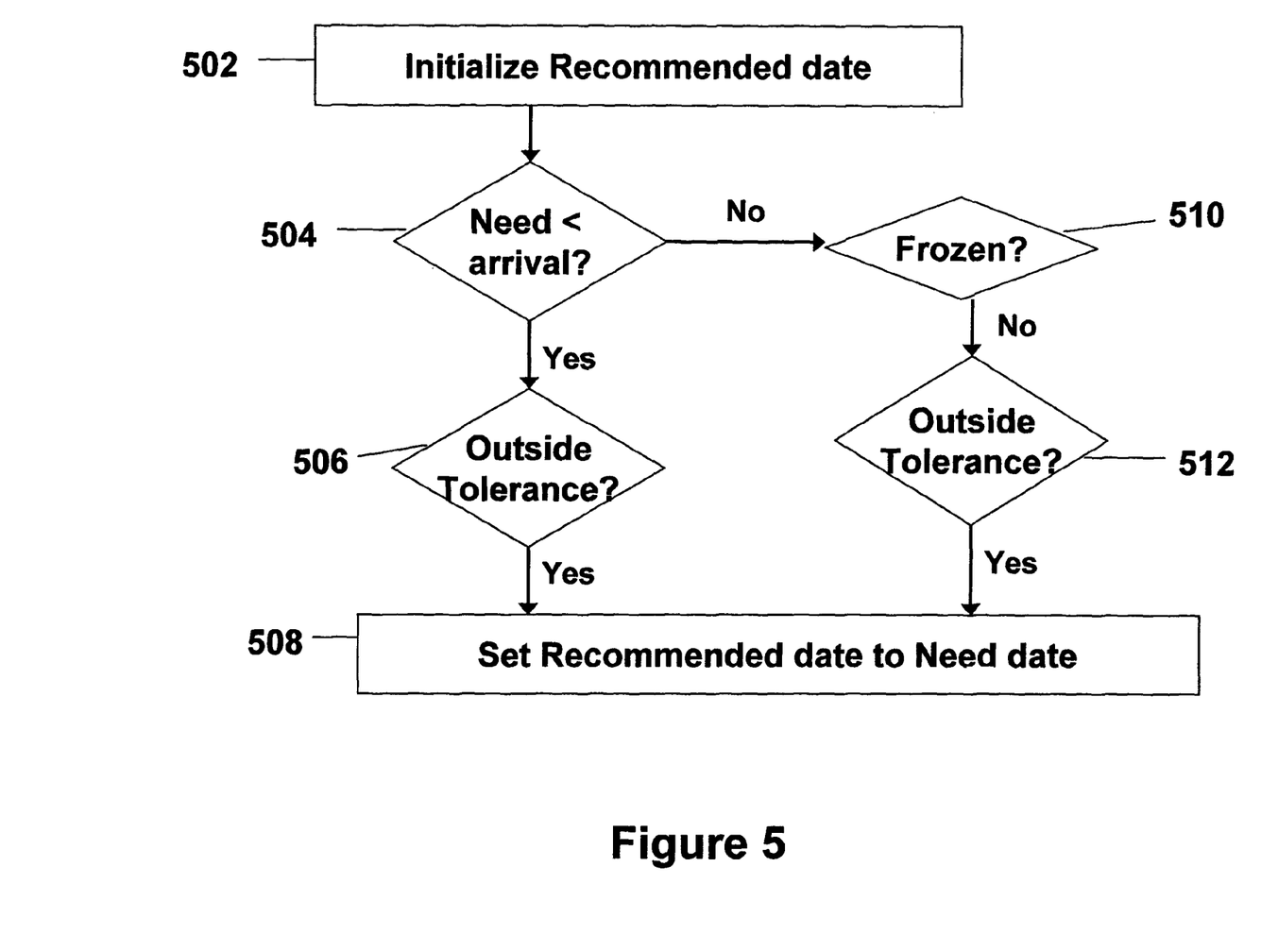
FIG. 5: Summary of the logic for determining recommended arrival dates.

Block 306 determines recommended arrival dates for the purchase order receipts. The recommended arrival dates are often the same as the need dates of the purchase order receipts but may be different due to contractual agreements or a desire to avoid the introduction of trivial rescheduling changes. The logic of block 306 is summarized in FIG. 5. In block 502, the recommended arrival date is initialized to the original scheduled arrival date. The remaining blocks of FIG. 5 determine whether the purchase order receipt needs to be rescheduled. Block 504 examines whether the need date determined by block 304 is earlier than the original scheduled arrival date. If the need date is earlier, block 506 checks to see whether it is earlier by more than the required tolerance. If it is, then block 508 will set the purchase order receipt's recommended arrival date to the need date. If block 504 determines that the need date is later than the original scheduled arrival date, then block 510 checks to see whether the receipt's scheduled receipt date is within the frozen zone. If is not within the frozen zone, then it is contractually permissible for the orderer to reschedule the purchase order receipt. If the receipt is not within the frozen zone, block 512 will check whether the need date is later than the scheduled arrival date by more than the required tolerance. If it is, block 508 will set the purchase order receipt's recommended arrival date to the need date. The value of the tolerance used in block 506 may or may not be different than the value of the tolerance used in block 512. The general idea of the tolerance is to avoid unimportant schedule churn.

In block 308, ending inventory balances are recomputed under the assumption that the recommended arrival dates are the dates when the purchase order receipts will arrive at the receiving plant. This re-computation is necessary if the period ending inventory is an important output of the production plan. In such cases, the re-computation is performed for all purchase order receipts for those time periods between the recommended receipt date inclusive and the original scheduled receipt date inclusive.

Following is a pseudo code description of one example of the current invention:

DEFINITIONS

FROZEN_IN: This number of days beyond the PLANDATE denotes the earliest date to which the can be rescheduled to (i.e. order can't be moved earlier than PLANDATE+FROZEN_IN)
FROZEN_OUT: This number of days beyond the PLANDATE denotes the date such that orders prior to this date cannot be rescheduled out
NET_UP_FRONT: yes/no flag indicating whether the purchase order receipt can be rescheduled to an earlier date
ORIGINAL_PROJECTED_DATE: originally scheduled arrival date for a particular purchase order receipt arrival
PLAN_START_DATE: first date in the planning horizon
PLAN_END_DATE: last date in the planning horizon
NEED_DATE: date on which some of the quantity for a particular purchase order receipt are utilized for manufacturing
RECOMMMENDED_DATE: rescheduled date for the purchase order receipt recommended by the application of the rescheduling method
PURCHASE: set of purchase order receipt records for arrival of parts to specified stocking locations
CANCELLATION_FLAG=yes/no flag indicating whether the purchase order receipt can be cancelled
MIN_RESCHEDULE_IN: Tolerance measured in number of days. If the need date is not more than this tolerance from the ORIGINAL_PROJ_DATE then do not reschedule (i.e. avoid trivial rescheduling changes)
PN: part number
PLANT: manufacturing location
Step 1: For (all purchase order receipts in PURCHASE for which the NET_UP_FRONT flag is set to "yes"){
Save the original projected date in ORIGINAL_PROJ_DATE for use in Step 5
Set the new projected date for the purchase order receipt to PLANDATE+
FROZEN_IN
}
Save purchase order receipts (with new projected dates) to PURCHASE
Step 2: Create and solve an instance of the LP model using revised PURCHASE created in Step 1
Step 3: Sort records in PURCHASE according to a preferred ordering (e.g. from earliest to latest date)
Step 4: Using the LP solution from step 2 Compute NEED_DATE for all purchase order receipts in PURCHASE:
For (all purchase order receipts in PURCHASE){
Compute NEED_DATE:
a) Iteratively move the purchase order receipt out in the planning horizon one period at a time.
b) For each move out recompute material balance equations throughout the planning horizon (current date to PLAN_END_DATE)
c) If inventory drops below zero for any period in planning horizon back up to previous period (This period is the NEED_DATE). If the PLAN_END_DATE is reached then it is the NEED_DATE
}Step 5: Compute RECOMMEND_DATE for all purchase order receipts in PURCHASE:
For (all purchase order receipts in PURCHASE){
if (ORIGINAL_PROJ_DATE>(PLAN_START_DATE_+FROZEN_OUT_DATE)){
if((ORIGINAL_PROJ_DATE NEED_DATE)>0&&(PROJ_DATE NEED_DATE)<=MIN_RESCHEDULE_IN){
RECOMMEND_DATE=ORIGINAL_PROJ_DATE
}
else RECOMMEND_DATE=NEED_DATE
if(RECOMMEND_DATE>END_DATE) set CANCELLATION_FLAG="yes"
}
}
Step 6: Iteratively recompute inventory based on RECOMMENDED_DATE and save for final output of solution:
For (all purchase order receipts in PURCHASE){
Recomputed inventory variables for the relevant PN/PLANT for all periods between PROJ_DATE and RECOMMENDED_DATE to rebalance inventory equations
}

The present invention has been implemented on an IBM P690 server using the AIX operating system. The steps for implementing the present invention are preferably programmed in C/C++. It should be understood by those of ordinary skill in the art, however, that the present invention is not limited to the above implementation and is independent of the computer/system architecture. Accordingly, the present invention may equally be implemented on other computing platforms, programming languages and operating systems, and also may be hardwired into a circuit or other computational component.

Thus, as shown above, the invention reschedules the timing of when items on purchase orders are scheduled to be received in a linear programming production planning system to maximize efficiency and minimize the cost of inventory. This methodology initially artificially reschedules the timing of purchase order receipts into the earliest time period allowable in a pre-processing step. After this pre-processing, the invention solves the core production planning system equations using the rescheduled purchase order receipts and subsequently reverses this artificial rescheduling in a post-processing rescheduling process.

Therefore, with the invention, the conventional core production planning equations and limitations are calculated assuming that all items on almost all purchase orders are received at the very beginning of the production planning horizon. In other words, this allows the invention to ignore various purchase order receipt timing issues (except for purchase order receipts that are frozen or have specific timing restrictions, as discussed in greater detail below) to most efficiently allocate different resources and different planning requirements within the production planning system. After the core production planning process is completed, the timing of the purchase order receipts is rescheduled (post-processing) so that this artificial timing advancement limitation (which permitted artificial maximum flexibility within the production planning system) is eliminated. By reversing the artificial advancements of timing of purchase order receipts in the post-processing, the invention pushes the actual timing of purchase order receipts back as far as possible within the production planning horizon so as to minimize costs associated with maintaining an excessively large inventory.

The post-processing pushes the timing of the purchase order receipts back to the latest allowable periods within the production planning system by sorting the purchase order receipts according to their rescheduling flexibility. The invention then subsequently reschedules (e.g., sequentially reschedules) the timing of each of the purchase order receipts in the order established by the sorting process. This post-processing reschedules the timing of purchase order receipts into the latest time period allowable, again, to minimize the cost of inventory.

While the invention has been described in terms of the preferred embodiments, those skilled in the art will recognize that the invention can be practiced with modification within the spirit and scope of the appended claims.

The invention claimed is:

1. A computer-implemented method for determining a production plan, said method comprising:
   receiving, by a computer, a file comprising purchase order receipts, said purchase order receipts being defined as line items on purchase orders;
   performing, by said computer, a first rescheduling process, said first rescheduling process comprising:
      evaluating each purchase order receipt to determine whether rescheduling of said purchase order receipt is one of permissible and impermissible, as indicated by a flag; and
      for all of said purchase order receipts for which rescheduling is determined to be permissible, rescheduling when said purchase order receipts are to be received by a plant so as to indicate that said purchase order receipts will be received by said plant during earlier time periods than initially specified;
   after said performing of said first rescheduling process, solving core production planning system equations with linear programming using rescheduled purchase order receipts associated with said earlier time periods from said first rescheduling process so as to determine an initial production plan;
   after said solving of said core production planning system equations with said linear programming, performing, by said computer, post-processing, said post-processing comprising:
      performing a second rescheduling process, said second rescheduling process comprising rescheduling when said rescheduled purchase order receipts from said first rescheduling process are to be received by said plant so as to indicate that said rescheduled purchase order receipts will be received by said plant during later time periods than specified during said first rescheduling process without causing inventory balances to be depleted to zero; and
      generating and outputting, by said computer, a final production plan based on said initial production plan and said second rescheduling process.

2. The method of claim 1, said flag comprising a net up front flag indicating that said purchase order receipt may not be rescheduled to an earlier point in time.

3. The method of claim 1, said flag comprising a frozen in zone flag specifying a time period within which said purchase order receipt can be rescheduled.

4. The method of claim 1, said second rescheduling process being based upon one of a date of need, frozen zone rules, and date tolerances.

5. The method of claim 1, further comprising after said solving, sorting of said rescheduled purchase order receipts from said first rescheduling process.

6. The method of claim 5, said sorting being based upon one of arrival dates, purchase order receipt quantity, and the flexibility of purchase order receipt movement with respect to frozen zone rules.

7. The method of claim 1, further comprising recomputing ending inventory levels to reflect said second rescheduling process.

8. A computer-implemented method of rescheduling timing of when items on purchase orders are rescheduled to be received in a linear programming production planning system, said method comprising:
   receiving, by a computer, a file comprising purchase order receipts, said purchase order receipts being defined as line items on purchase orders;
   performing, by said computer, a first rescheduling process, said first rescheduling process comprising:
      evaluating each purchase order receipt to determine whether rescheduling of said purchase order receipt is one of permissible and impermissible, as indicated by a flag comprising any one of a net up front flag indicating that said purchase order receipt may not be rescheduled to an earlier point in time and a frozen in zone flag specifying a time period within which said purchase order receipt can be rescheduled; and
      for all of said purchase order receipts for which rescheduling is determined to be permissible, rescheduling when said purchase order receipts are to be received by a plant so as to indicate that said purchase order receipts will be received by said plant during the earliest time periods allowable by a supplier;
   after said performing of said first rescheduling process, solving core production planning system equations with linear programming using rescheduled purchase order receipts associated with said earliest time periods allowable by said supplier from said first rescheduling process so as to determine an initial production plan;
   after said solving of said core production planning system equations with said linear programming, performing, by said computer, post-processing, said post-processing comprising:
      sorting said rescheduled purchase order receipts from said first rescheduling process, based on predetermined criteria;
      based on said sorting, performing, by said computer, a second rescheduling process, said second rescheduling process comprising rescheduling when said rescheduled purchase order receipts from said first rescheduling process are to be received by said plant so as to indicate that said rescheduled purchase order receipts will be received by said plant during the latest time periods allowable by said supplier without causing inventory balances to be depleted to zero; and generating and outputting, by said computer, a final production plan based on said initial production plan and said second rescheduling process.

9. The method in claim 8, said sorting comprising:

sorting said rescheduled purchase order receipts into different classes of rescheduling flexibility;

sorting said rescheduled purchase order receipts within each of said classes of rescheduling flexibility into different classes of arrival dates; and sorting said rescheduled purchase order receipts within each of said classes of arrival dates based on quantities within said rescheduled purchase order receipts.

10. The method in claim 8, said second rescheduling process rescheduling each of said purchase order receipts into the latest time period before the corresponding inventory level would be depleted to zero.

11. The method in claim 8, said first rescheduling process further comprising, for each purchase order receipt, determining whether a time period for receiving by said plant of said purchase order receipt can be extended beyond the latest date of the planning horizon of said linear programming production planning system; and, if so, eliminating said purchase order receipt.

12. The method in claim 8, further comprising recomputing ending inventory levels to reflect said second rescheduling process.

13. The method in claim 8, said second rescheduling process further limiting rescheduling to comply with contractual obligations and to avoid trivial rescheduling.

14. A computer-implemented method of rescheduling timing of when items on purchase orders are rescheduled to be received in a linear programming production planning system, said method comprising:

receiving, by a computer, a file comprising purchase order receipts, said purchase order receipts being defined as line items on purchase orders;

performing, by said computer, a first rescheduling process, said first rescheduling process comprising:

evaluating each purchase order receipt to determine whether rescheduling of said purchase order receipt is one of permissible and impermissible, as indicated by a first flag comprising any one of a net up front flag indicating that said purchase order receipt may not be rescheduled to an earlier point in time and a frozen in zone flag specifying a time period within which said purchase order receipt can be rescheduled; and for all of said purchase order receipts for which rescheduling is determined to be permissible, rescheduling when said purchase order receipts are to be received by a plant so as to indicate that said purchase order receipts will be received by said plant during the earliest time periods allowable by a supplier;

after said performing of said first rescheduling process, solving core production planning system equations with linear programming using rescheduled purchase order receipts associated with said earliest time periods allowable by said supplier from said first rescheduling process so as to determine an initial production plan;

after said solving of said core production planning system equations with said linear programming, performing, by said computer, post-processing, said post-processing comprising:

sorting said rescheduled purchase order receipts from said first rescheduling process according to rescheduling flexibility, said sorting comprising, for each rescheduled purchase order receipt, determining whether rescheduling is still permissible, as indicated by a second flag, said second flag comprising a frozen out zone flag specifying another time period within which said rescheduled purchase order receipt can not be rescheduled later in time;

based on said sorting, performing, by said computer, a second rescheduling process, said second rescheduling process comprising, for all of said rescheduled purchase order receipts for which rescheduling is determined to be still permissible, rescheduling when said rescheduled purchase order receipts from said first rescheduling process are to be received by said plant so as to indicate that said rescheduled purchase order receipts will be received by said plant during the latest time periods allowable by said supplier without causing inventory balances to be depleted to zero; and generating and outputting, by said computer, a final production plan based on said initial production plan and said second rescheduling process.

15. The method in claim 14, said sorting comprising:

sorting said rescheduled purchase order receipts into different classes of rescheduling flexibility;

sorting said rescheduled purchase order receipts within each of said classes of rescheduling flexibility into different classes of arrival dates; and sorting said rescheduled purchase order receipts within each of said classes of arrival dates based on quantities within said rescheduled purchase order receipts.

16. The method in claim 14, said second rescheduling process rescheduling each of said rescheduled purchase order receipts into the latest time period before the corresponding inventory level would be depleted to zero.

17. The method in claim 14, said first rescheduling process further comprising, for each purchase order receipt, determining whether a time period for receiving by said plant of said purchase order receipt can be extended beyond the latest date of the planning horizon of said linear programming production planning system; and, if so, eliminating said purchase order receipt.

18. The method in claim 14, further comprising recomputing ending inventory levels to reflect said second rescheduling process.

19. A program storage device readable by machine, tangibly embodying a program of instructions executable by the machine to perform a method of rescheduling timing of when items on purchase orders are rescheduled to be received in a linear programming production planning system, said method comprising:

receiving a file comprising planned purchase order receipts, said purchase order receipts being defined as line items on purchase orders;

performing a first rescheduling process, said first rescheduling process comprising:

evaluating each purchase order receipt to determine whether rescheduling of said purchase order receipt is one of permissible and impermissible, as indicated by a flag comprising any one of a net up front flag indicating that said purchase order receipt may not be rescheduled to an earlier point in time and a frozen in zone flag specifying a time period within which said purchase order receipt can be rescheduled; and for all of said purchase order receipts for which rescheduling is determined to be permissible, rescheduling when said purchase order receipts are to be received by a plant so as to indicate that said purchase order receipts will be received by said plant during the earliest time periods allowable by a supplier;

after said performing of said first rescheduling process, solving core production planning system equations with linear programming using rescheduled purchase order receipts associated with said earliest time periods allowable by said supplier from said first rescheduling process so as to determine an initial production plan;

after said solving of said core production planning system equations with said linear programming, performing, by said computer, post-processing, said post-processing comprising:

sorting said rescheduled purchase order receipts from said first rescheduling process, based on predetermined criteria;

based on said sorting, performing a second rescheduling process, said second rescheduling process comprising rescheduling when said rescheduled purchase order receipts from said first rescheduling process are to be received by said plant so as to indicate that said rescheduled purchase order receipts are to be received by said plant during the latest time periods allowable by said supplier without causing inventory balances to be depleted to zero; and generating and outputting a final production plan based on said initial production plan and said second rescheduling process.

20. The program storage device in claim 19, said sorting comprising:

sorting said rescheduled purchase order receipts into different classes of rescheduling flexibility;

sorting said rescheduled purchase order receipts within each of said classes of rescheduling flexibility into different classes of arrival dates; and sorting said rescheduled purchase order receipts within each of said classes of arrival dates based on quantities within said rescheduled purchase order receipts.

21. The program storage device in claim 19, said second rescheduling process rescheduling each of said rescheduled purchase order receipts into the latest time period before the corresponding inventory level would be depleted to zero.

22. The program storage device in claim 19, said first rescheduling process further comprising, for each purchase order receipt, determining whether a time period for receiving by said plant of said purchase order receipt can be extended beyond the latest date of the planning horizon of said linear programming production planning system; and, if so, eliminating said purchase order receipt.

23. The program storage device in claim 19, said method further comprising recomputing ending inventory levels to reflect said second rescheduling process.

24. The program storage device in claim 19, said second rescheduling process further limiting rescheduling to comply with contractual obligations and to avoid trivial rescheduling.

* * * * *